US009810248B2

(12) United States Patent
LeBlanc et al.

(10) Patent No.: US 9,810,248 B2
(45) Date of Patent: Nov. 7, 2017

(54) CONTROL FLUID POWER APPARATUS AND RELATED METHODS

(71) Applicant: Emerson Process Management, Valve Automation, Inc., Houston, TX (US)

(72) Inventors: William Kenneth LeBlanc, Mansfield, OH (US); David John Hoke, Richmond, TX (US)

(73) Assignee: Emerson Process Management, Valve Automation, Inc., Houston, TX (US)

( * ) Notice: Subject to any disclaimer, the term of this patent is extended or adjusted under 35 U.S.C. 154(b) by 412 days.

(21) Appl. No.: 14/662,672

(22) Filed: Mar. 19, 2015

(65) Prior Publication Data

US 2016/0273561 A1 Sep. 22, 2016

(51) Int. Cl.

| | |
|---|---|
| ***F16D 31/02*** | (2006.01) |
| ***F15B 20/00*** | (2006.01) |
| ***F15B 1/02*** | (2006.01) |
| ***F15B 3/00*** | (2006.01) |
| ***F15B 1/04*** | (2006.01) |

(Continued)

(52) U.S. Cl.

CPC .............. *F15B 20/00* (2013.01); *F15B 1/024* (2013.01); *F15B 1/025* (2013.01); *F15B 1/04* (2013.01); *F15B 3/00* (2013.01); *F15B 13/0401* (2013.01); *F15B 15/12* (2013.01); *F15B 2201/00* (2013.01); *F15B 2201/20* (2013.01); *F15B 2211/20515* (2013.01); *F15B 2211/212* (2013.01); *F15B 2211/275* (2013.01); *F15B 2211/865* (2013.01)

(58) Field of Classification Search

CPC ........... F15B 15/12; F15B 1/024; F15B 1/025

USPC ............................................... 60/416; 92/122

See application file for complete search history.

(56) References Cited

U.S. PATENT DOCUMENTS

| | | | |
|---|---|---|---|
| 2,849,987 | A | 9/1958 | Shafer |
| 3,911,678 | A | 10/1975 | Shafer et al. |
| 2005/0178560 | A1 | 8/2005 | Johansen et al. |

FOREIGN PATENT DOCUMENTS

| | | | | |
|---|---|---|---|---|
| CA | 1237627 | | 6/1988 | |
| CA | 1237627 A * | | 7/1988 | ................ F15B 1/08 |

(Continued)

OTHER PUBLICATIONS

Emerson Process Management, "Shafer Electro Hydraulic Power Unit," 2009, 4 pages.

(Continued)

*Primary Examiner* — Michael Leslie
*Assistant Examiner* — Daniel Collins
(74) *Attorney, Agent, or Firm* — Hanley, Flight & Zimmerman, LLC

(57) ABSTRACT

Control fluid power apparatus and related methods are disclosed. An example control fluid power apparatus includes a first housing having a first piston defining a first chamber and a second chamber, where the first chamber receives a control fluid and the second chamber receives a process fluid from a process system. The first chamber is oriented above the second chamber when the control fluid power apparatus is coupled to a control valve assembly. A second housing has a second piston defining a third chamber and a fourth chamber, where the third chamber receives the control fluid and the second chamber receives the process fluid. The third chamber is oriented above the fourth chamber when the control fluid power apparatus is coupled to the control valve assembly.

20 Claims, 3 Drawing Sheets

(51) Int. Cl.
*F15B 13/04* (2006.01)
*F15B 15/12* (2006.01)

(56) References Cited

FOREIGN PATENT DOCUMENTS

| | | |
|---|---|---|
| DE | 20119416 | 4/2003 |
| WO | 2016149249 | 9/2016 |

OTHER PUBLICATIONS

Emerson Process Management, "Shafer Rotary Vane Maintenance and Service Manual," May 2002, 12 pages.
Emerson Process Management, "Shafer RV-Series Rotary Vane Valve Actuators Operating Valves in Critical Pipeline Applications," 2013, 8 pages.
International Searching Authority, "International Search Report," issued in connection with International Patent Application No. PCT/US2016/022433, dated Jun. 14, 2016, 4 pages.
International Searching Authority, "Written Opinion," issued in connection with International Patent Application No. PCT/US2016/022433, dated Jun. 14, 2016, 6 pages.

* cited by examiner

CONTROL FLUID POWER APPARATUS AND RELATED METHODS

FIELD OF THE DISCLOSURE

The present disclosure relates generally to power apparatus and, more particularly, to control fluid power apparatus and related methods.

BACKGROUND

Gas-over-oil control valve systems are often employed in process systems (e.g., off-shore drilling wells, oil fields, natural gas transmission pipeline, etc.,) in remote locations where a power source (e.g., pneumatic or electrical power) may be unavailable. Specifically, gas-over-oil control valve system use high pressure process fluid flowing through a process fluid pipeline (e.g., natural gas) to provide energy to power a control valve (e.g., an actuator) instead of, for example, pneumatic or electrical power. In particular, a gas-over-oil system includes hydraulic control fluid stored in external vessels. The hydraulic control fluid is pressurized by channeling process fluid in a transmission pipeline directly over and in contact with the hydraulic control fluid, which forces the hydraulic fluid into the control valve (e.g., an actuator of the control valve).

However, known gas-over-oil control valve systems exhaust the pipeline process fluid (e.g., natural gas) to atmosphere after the hydraulic control fluid stokes the control valve. The exhausting fluid can produce loud noise and/or high velocity flow. In some instances, the pressure vessels have relatively large volumes and require approximately 15 to 20 seconds to fill and/or evacuate the process fluid from the pressure vessels. Further, gas-over-oil systems do not employ a fail-safe mechanism because these systems typically lack a spring. Additionally, the process fluid (e.g., the gas) directly engages the hydraulic oil in the pressure vessels without a barrier therebetween. Thus, impurities in the process fluid may contaminate the hydraulic fluid and may result in damage to the actuator and/or other components of the gas-over-oil systems.

SUMMARY

In one example, an example control fluid power apparatus includes a first housing having a first piston defining a first chamber and a second chamber, where the first chamber receives a control fluid and the second chamber receives a process fluid from a process system. The first chamber is oriented above the second chamber when the control fluid power apparatus is coupled to a control valve assembly. A second housing has a second piston defining a third chamber and a fourth chamber, where the third chamber receives the control fluid and the second chamber receives the process fluid. The third chamber is oriented above the fourth chamber when the control fluid power apparatus is coupled to the control valve assembly.

In another example, an example control fluid power apparatus includes a rotary vane actuator having a vane defining a first cavity and a second cavity. A first accumulator has a first piston to define a first chamber and a second chamber, where the first chamber receives a control fluid and the second chamber is fluidly coupled to a process fluid flowing through a process system pipeline. The first chamber is positioned topside the second chamber when the first accumulator is coupled to a control valve such that the second chamber is positioned between the first chamber and the process system pipeline. A second accumulator has a second piston to define a third chamber and a fourth chamber. The third chamber receives the control fluid and the fourth chamber is fluidly coupled to the process fluid flowing through the process system pipeline. The third chamber is positioned topside the fourth chamber when the second accumulator is coupled to the control valve such that the fourth chamber is positioned between the third chamber and the process system pipeline. The third chamber of the second accumulator is fluidly coupled to the first chamber of the first accumulator. A directional controller directs fluid flow between the first chamber of the first accumulator and at least one of the first cavity or the second cavity of the actuator.

In another example, a control fluid power apparatus includes first means for storing energy having a first means for receiving a control fluid and a second means for receiving a process fluid, where the first means for receiving the control fluid is positioned above the second means for receiving the process fluid. The apparatus includes second means for storing energy having a third means for receiving the control fluid and fourth means for receiving the process fluid, where the third means for receiving the control fluid is positioned above the fourth means for receiving the process fluid. First means for fluidly coupling the first means for receiving the control fluid and the third means for receiving the control fluid to a control fluid supply. The apparatus includes second means for fluidly coupling the second means for receiving the process fluid and the fourth means for receiving the process fluid to a pipeline of a process system, where the second means for receiving the process fluid and the fourth means for receiving the process fluid is positioned above the pipeline when the fluid control valve is coupled to the process system.

DETAILED DESCRIPTION

Figure 1:
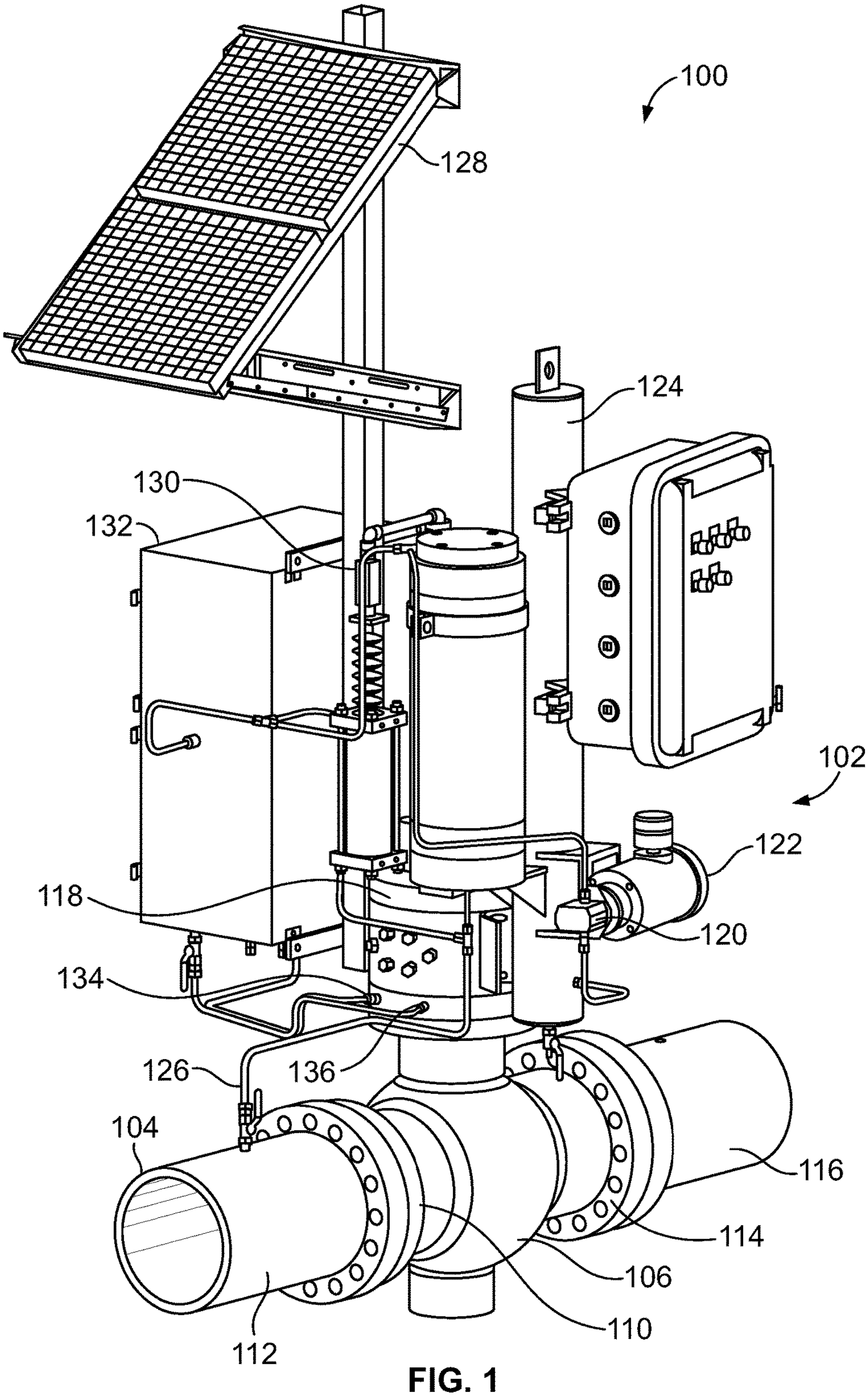
FIG. 1 illustrates an example control valve assembly having an example control fluid power apparatus in accordance with the teachings of this disclosure.

Example control fluid power apparatus disclosed herein may be used in remote locations (e.g., where pneumatic or electrical power may be unavailable) to provide power (e.g., hydraulic power) to a process system component or equipment. For example, the control fluid power apparatus disclosed herein may be used to provide pressurized control fluid (e.g., hydraulic oil) to equipment (e.g., hydraulic equipment) such as cylinders, valve actuators, or other machinery requiring high pressure fluid to operate. Specifically, like gas-over-oil systems, the example control fluid power apparatus disclosed herein use a pressurized process fluid (e.g., natural gas) to pressurize and/or deliver a pressurized control fluid to the process system component during operation. However, unlike conventional gas-over-oil systems, the example control fluid power apparatus disclosed herein does not exhaust the process fluid to the atmosphere. Instead, any process fluid used by the example control fluid power apparatus disclosed herein flows back to the original source of the fluid or the process fluid pipeline. Thus, the example control fluid power apparatus exhaust substantially zero process fluid emissions.

Further, unlike many known gas-over-oil systems, the example control fluid power apparatus disclosed herein include one or more accumulator apparatus to provide, for example, energy storage, energy accumulation, etc. For example, a control fluid power apparatus disclosed herein may be used to store energy such as a pressurized control fluid. For example, a control fluid power apparatus disclosed herein may be used to store pressurized hydraulic fluid provided by a hydraulic pump when a hydraulic system demand is low (e.g., a hydraulic actuator is not being actuated) and to supply such previously stored pressurized hydraulic fluid when demand of the hydraulic system increases (e.g., the hydraulic actuator is being actuated). However, unlike known accumulators, the accumulators used to implement the example control fluid power apparatus described herein do not require use of a pre-charged gas (e.g., inert gas such as nitrogen). On the contrary, the example control fluid power apparatus disclosed herein employ accumulator apparatus that are charged and/or operated using a pressure of a process fluid (e.g., natural gas) of a distribution system to which the example control fluid power apparatus is fluidly coupled.

Additionally, because a transmission pipeline containing the process fluid has a volume significantly greater than a volume of a control fluid contained by the example control fluid power apparatus disclosed herein, an operating pressure of the example control fluid power apparatus disclosed herein remains relatively constant (e.g., a change of plus or minus approximately 5 psi) during a cycling or operation of a process system component or equipment. In other words, the relatively large volume of process fluid in a pipeline and its pressure remains substantially constant (e.g., remains within one psi) when the example control fluid power apparatus disclosed herein operates between a fully charged state (e.g., when the control fluid power apparatus is pressured and ready to power the process system component or actuator) and a fully discharged state (e.g., when the control power apparatus provides control fluid to a process system component or actuator). As a result, the constant pressure is effective in producing a constant or fixed torque output throughout the operation of the example control fluid power apparatus disclosed herein. For example, the control fluid power apparatus disclosed herein provides a constant torque output throughout a stroke (e.g., an entire stroke) of an actuator of a control valve as the actuator moves between a first position and a second position. In this manner, the actuator is capable of stroking rapidly between an initial stroke position and an end stroke position (e.g., between approximately one and three seconds).

In some examples, a control fluid power apparatus disclosed herein may employ a thermal volume controller. In some examples, the thermal volume controller ensures that the control fluid power apparatus is fully charged or filled with a control fluid during a recharging operation. For example, the thermal volume controller operates an electric switch to activate and deactivate a motor and a pump that fill or charge the control fluid power apparatus with a control fluid. Furthermore, in some examples, the thermal volume controller may compensate and/or adjust for pressure variations and/or fluctuations in a process fluid pipeline. As a result, unlike conventional electro-hydraulic systems, the example thermal volume controller disclosed herein eliminates the need for pressure switches to operate a motor and/or pump. Conventional pressure switches require recalibration or re-adjustment as pressure of process fluid changes or fluctuates in the pipeline. In contrast, the example thermal volume controller described herein does not require any adjustment because the thermal volume controller automatically adjusts and/or compensates for pressure fluctuations of the process fluid in the pipeline. Additionally, the example thermal volume controller disclosed herein may compensate for thermal expansion and/or pressure variations of a control fluid of the example control fluid power apparatus due to temperature variations (e.g., diurnal temperature variations).

Additionally, unlike conventional hydro-electric systems and/or gas-over-oil systems, the example control fluid power apparatus disclosed herein may be oriented in a manner where a control fluid (e.g., a hydraulic fluid) is positioned over (e.g., topside) of the process fluid (e.g., natural gas) As a result, the attitude and/or orientation of the process fluid causes impurities and/or contaminates in the process fluid to gravitate or flow back into the process fluid pipeline via gravity when the process fluid is exhausted from the control fluid power apparatus. In some examples, wetted components of the example control fluid power apparatus may be coated with a material (e.g., Teflon or a non-sticking agent) to further help direct impurities and/or contaminates in the process fluid toward the pipeline and out of the control fluid power apparatus, thereby increasing the operational life of the control fluid power apparatus.

FIG. 1 illustrates an example control valve assembly 100 having an example control fluid power apparatus 102 constructed in accordance with the teachings disclosed herein. The example control valve assembly 100 of the illustrated example is coupled to a pipeline 104. The control valve assembly 100 of the illustrated example includes a valve 106 (e.g., a quarter turn ball valve) to control fluid flow through the pipeline 104. Specifically, the valve 106 of the illustrated example defines a fluid flow passageway between an inlet 110 fluidly coupled to a first portion 112 of the pipeline 104 and an outlet 114 fluidly coupled to a second portion 116 of the pipeline 104. A fluid control member (e.g., a ball valve) is interposed in the fluid flow passageway to control fluid flow between the inlet 110 and the outlet 114. To move the fluid control member, the control valve assembly 100 of the illustrated example includes an actuator 118 (e.g., a quarter turn or 90 degree rotatable actuator). For example, the actuator 118 of the illustrated example is operatively coupled to the fluid control member (e.g., via a valve shaft) and moves the flow control member between a first position (e.g., a fully open position) to allow fluid flow between the inlet 110 and the outlet 114 and a second position (e.g., a fully closed position) to restrict or prevent fluid flow between the inlet 110 and the outlet 114.

The actuator 118 of the illustrated example is a hydraulic actuator (e.g., a hydraulic rotary vane actuator). A pump 120 (e.g., a hydraulic pump) operated by a motor 122 (e.g., an electric motor) supplies control fluid (e.g., pressurized hydraulic fluid) from a reservoir 124 to the control fluid power apparatus 102. The control fluid power apparatus 102 employs pressurized process fluid (e.g., natural gas) from the pipeline 104 to provide pressure sufficient to cause the control fluid to operate the actuator 118 through a complete stroke of the actuator 118. For example, the control fluid power apparatus 102 is fluidly coupled to the process fluid upstream from the inlet 110 via a pressure line 126 (e.g., tubing).

In the illustrated example, a solar panel assembly 128 provides electrical power to the motor 122. However, in some examples, the control valve assembly 100 may receive electrical power via an electrical grid system (e.g., utility power grid). In the illustrated example, the motor 122 is activated or deactivated via an electric motor control switch 130 that is operated by the control fluid power apparatus 102. The example control valve assembly 100 employs a directional controller 132 to direct the control fluid from the control fluid power apparatus 102 to different ports 134 and 136 of the actuator 118 to control a stroke direction of the actuator 118. The directional controller 132 may receive a signal from a remote location (e.g., a control room) or may be operated locally via manual knobs and/or a hand pump. For example, a technician can operate the directional controller 132 when servicing the control valve assembly 100.

Figure 2:
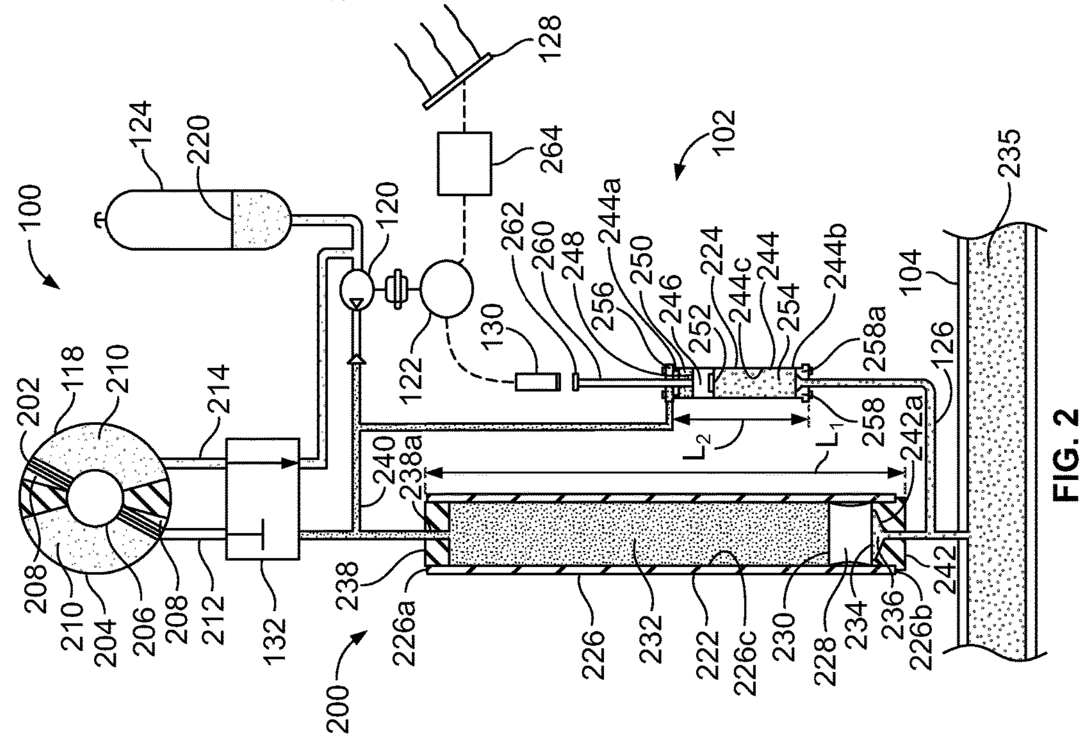
FIG. 2 is a schematic illustration of the example control valve assembly of FIG. 1 showing the example control fluid power apparatus in a fully charged state.

FIG. 2 is a schematic illustration of the example fluid control valve assembly 100 shown in FIG. 1 showing the control fluid power apparatus 102 in a charged (e.g., a fully charged) condition or state 200. As shown in FIG. 2, the actuator 118 of the illustrated example includes a vane 202 movable or rotatable within a housing 204 of the actuator 118. The vane 202 is coupled to a valve shaft 206 which, in turn, is coupled to a valve plug (e.g., a ball valve) of the valve 106 (FIG. 1). The vane 202 and the actuator housing 204 define a first cavity or chamber 208 and a second cavity or chamber 210. A first line 212 (e.g., tubing) fluidly couples the first chamber 208 to the directional controller 132 and a second line 214 (e.g., tubing) fluidly couples the second chamber 210 to the directional controller 132. To operate the actuator 118, the directional controller 132 directs a control fluid 220 from the control fluid power apparatus 102 to either the first chamber 208 of the actuator 118 or the second chamber 210 of the actuator 118. In the fully charged state 200 shown in FIG. 2, the directional controller 132 isolates the control fluid power apparatus 102 (i.e., the control fluid 220) from the actuator 118.

As shown in FIG. 2, the control fluid power apparatus 102 includes a first accumulator 222 (e.g., a hydraulic accumulator) and a second accumulator 224 (e.g., a thermal volume controller). The example first accumulator 222 includes a first housing 226 (e.g., a cylindrical body or cylinder) having a length $L_1$. A first piston 228 is disposed within the first housing 226 such that a first side 230 of the first piston 228 and the first housing 226 defines a control fluid side or a first chamber 232 of the first accumulator 222 and a second side 234 of the first piston 228 and the first housing 226 define a process fluid side or a second chamber 236 (e.g., a gas chamber) of the first accumulator 222. In the illustrated example, the first side 230 of the first piston 228 has a first area that is substantially equal (e.g., identical) to a second area of the second side 234 of the first piston 228. The first piston 228 includes a seal (e.g., a T-seal) to prevent unwanted leakage of control fluid and/or process fluid past the first piston 228 between the first and second chambers 232 and 236.

Figure 4:
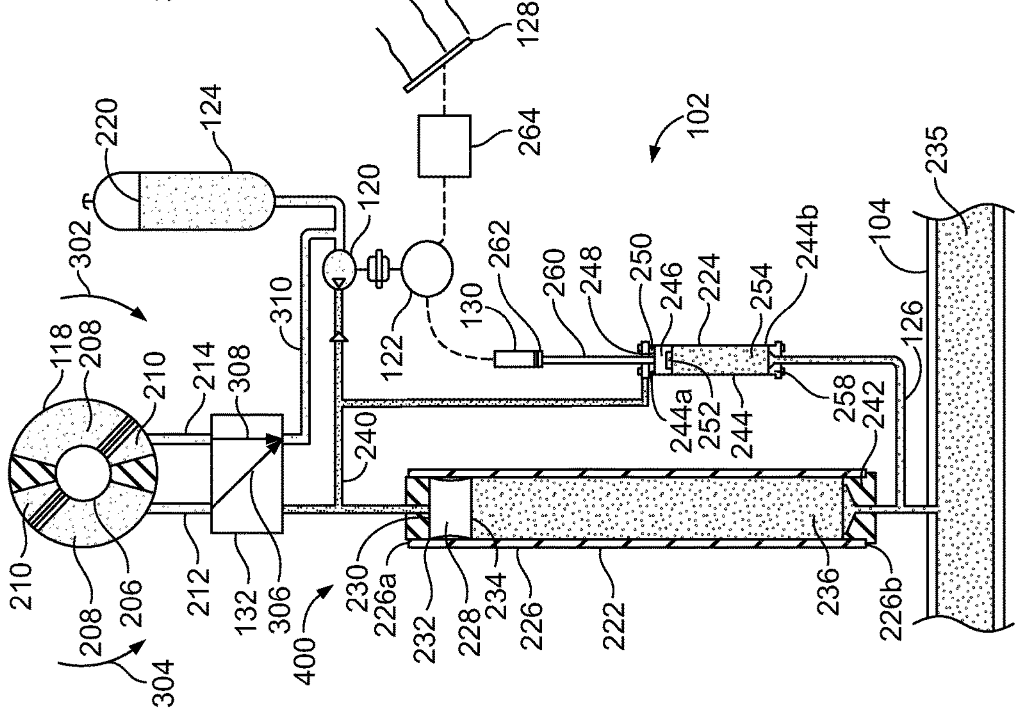
FIG. 4 is a schematic illustration of the example control valve assembly of FIGS. 1-3 showing the example control fluid power apparatus in a fully discharged state.

The first chamber 232, for example, receives the control fluid 220 (e.g., an incompressible fluid, a hydraulic fluid, etc.) and the second chamber 236 receives a process fluid 235 (e.g., a compressible fluid, natural gas, etc.) or other pressurized fluid flowing through the pipeline 104. The first piston 228 moves in a rectilinear manner along a longitudinal axis of the first housing 226 between a first position at which the first chamber 232 has a maximum volume and the second chamber 236 has a minimum volume (e.g., the fully charged position 200 as shown in FIG. 2), and a second position at which the first chamber 232 has a minimum volume and the second chamber 236 has a maximum volume (e.g., a fully discharged position 400 as shown in FIG. 4).

In the illustrated example, a first end **226*a* the first housing 226 includes a first end cap 238 adjacent the first chamber 232 and fluidly couples the first chamber 232 to a control fluid supply line 240. A second end 226*b* of the first housing 226 includes a second end cap 242 adjacent the second chamber 234 and fluidly couples the second chamber 234 to the process fluid 235 flowing through the pipeline 104 via the pressure line 126. The first end cap 238 and/or the second end cap 242 are removably coupled (e.g., via threads or fasteners such as bolts) to the first housing 226. However, in some examples, the first end cap 238 and/or the second end cap 242 may be integrally formed with the first housing 226**.

The example second accumulator 224 includes a second housing 244 (e.g., a cylindrical body or cylinder) having a length $L_2$. The volume and length $L_2$ of the second accumulator 224 is significantly less than (e.g., 10% of) a volume and/or the length $L_1$ of the first accumulator 222. A second piston 246 is disposed within the second housing 244 and has a first side 248 defining a control fluid side or a first chamber 250 and a second side 252 opposite the first side 248 defining a process fluid side or a second chamber 254 (i.e., a gas chamber) of the second accumulator 224. The second piston 246 of the illustrated example includes a seal to prevent unwanted leakage of the control fluid 220 and/or the process fluid 235 past the second piston 246 between the first and second chambers 250 and 254. The second piston 246 moves in a rectilinear manner along a longitudinal axis of the second housing 244 between a first position (e.g., as shown in the fully charged state 200 in FIG. 2) and a second position (e.g., as shown in the fully discharged state 400 in FIG. 4). The first chamber 250 receives the control fluid 220 and the second chamber 254 receives the process fluid 235.

In the illustrated example, a first end **244*a* of the second housing 244 has a first end cap 256 that fluidly couples the first chamber 250 of the second accumulator 224 to the supply line 240. In particular, the supply line 240 fluidly couples the first chamber 232 of the first accumulator 222 and the first chamber 250 of the second accumulator 224. In this example, a second end 244*b* of the second housing 244 has a second end cap 258 adjacent the second chamber 254 and fluidly couples the second chamber 254 to the process fluid 235 via the pressure line 126. The first end cap 256 and/or the second end cap 258 are removably coupled (e.g., via threads or fasteners such as bolts) to the second housing 244. However, in some examples, the first end cap 256 and/or the second end cap 258 may be integrally formed with the second housing 244**.

The second accumulator 244 of the illustrated example includes a shaft or rod 260 coupled to the first side 248 of the second piston 246. Due to the rod 260, the first side 248 of the second piston 246 has a first area that is less than a second area of the second side 252 of the second piston 246. Additionally, the rod 260 of the illustrated example includes a switch activator or target 262 that moves relative to the switch 130 to activate and/or deactivate the motor 122 and, thus, the pump 120. The target 262 of the illustrated example is composed of a ferrous or magnetic material and the switch 130 of the illustrated example is a proximity switch. Thus, activation and/or deactivation of the switch 130 may occur without direct engagement of the target 262 with the switch 130. For example, the rod 260 may activate and/or deactivate the motor 122 when the target 262 is in proximity (e.g., a quarter of an inch) relative to the switch 130 without directly engaging or contacting with the switch 130. A battery 264 is charged via the solar panels and supplies power to the motor 122 when the switch 130 is activated by the rod 260.

In the illustrated example, to facilitate impurities and/or contaminates (e.g., particle contaminates, hydrocarbon liquids, corrosive elements such as hydrogen sulfide, etc.) in the process fluid 235 to flow back to the pipeline 104, the first and second accumulators 222 and 224 of the illustrated example have a substantially vertical attitude or orientation, for example, relative to the ground or Earth. The attitude or orientation of each of the first and second accumulators 222 and 224 is such that the respective first chambers 232 and 250 are positioned above or topside the respective second chambers 236 and 254 when the control fluid power apparatus 102 is coupled to the control valve assembly 100. Specifically, the second chamber 236 of the first accumulator 222 is positioned between the first chamber 232 of the first accumulator 222 and the pipeline 104. Also, the second chamber 236 of the first accumulator 222 of the illustrated example is positioned above the pipeline 104. Similarly, the second chamber 254 of the second accumulator 224 is positioned between the first chamber 250 of the second accumulator 224 and the pipeline 104. Also, the second chamber 236 of the second accumulator 224 is positioned above the pipeline 104. Unlike many known gas-over-oil systems in which the process fluid or gas (natural gas) fills a reservoir from a top end and pushes a control fluid or hydraulic fluid through a bottom end of a reservoir (i.e., when the reservoir is in a vertical orientation), the example control fluid power apparatus 102 of the illustrated example orients the control fluid 220 topside relative to the process fluid 235. Such an attitude or orientation of the process fluid 235 facilitates gravitation of contaminates or impurities in the respective second chambers 236 and 254 back into the pipeline 104. Such a configuration significantly increases the life of the first and second accumulators 222 and 224 by significantly reducing damage to the first and second housings 226 and 244 and/or other components (e.g., the piston) wetted by the process fluid 235 due to, for example, corrosion, scoring and/or scratching.

Additionally, to facilitate gravitation of contaminates or impurities from the second chamber 232 of the first accumulator 222 back to the pipeline 104 when the first piston 228 moves toward the second end 226*b* of the first housing 226, the second end cap 242 of the illustrated example has a bore or opening 242*a* having a tapered or slanted profile or shape. Likewise, the second end cap 258 of the second accumulator 224 has a bore or opening 258*a* having tapered or slanted profile or shape to facilitate impurities or contaminates in the process fluid to be channeled back to the pipeline 104. However, in other examples, the second end cap 242 and/or the second end cap 258 do not include the tapered portions.

To further assist in increasing the life of the accumulators 222 and 224, an inner wall 226*c* of the first housing 226, an inner wall 244*c* of the second housing 244 and/or other process fluid wetted components (e.g., the first piston 228, the second piston 246, etc.) may be coated with a material (e.g., Teflon, etc.) to facilitate removal of contaminants in the process fluid 235.

When the first accumulator 222 is in the fully charged state 200 as shown in FIG. 2, the first chamber 232 of the first accumulator 222 has a maximum volume of control fluid 220 and the second chamber 236 has a minimum volume of the process fluid 235. For example, in the fully charged state 200, the first piston 228 is positioned adjacent the second end 226*b* and/or in engagement with the second end cap 242 of the first housing 226. In other words, the second chamber 236 has a substantially zero volume (e.g., no natural gas is stored in the second chamber 236). The second piston 246 is positioned between the first and second ends 244*a* and 244*b* such that the first chamber 250 contains a volume of the control fluid 220 and the second chamber 254 contains a volume of the process fluid 235. However, the rod 260 of the second accumulator 224 is spaced away from the switch 130 to deactivate the motor 122 and the pump 120.

In the fully charged state 200, the second accumulator 224 of the illustrated example isolates and/or protects the control fluid power apparatus 102 (e.g., the first and second housings 226, 244, the supply line 240, the pump 120, etc.) from pressure increases caused by thermal expansions in the control fluid 220 due to ambient temperature changes or fluctuations (e.g., diurnal temperature variations). For example, a control fluid composed of hydraulic oil may expand at a rate of 4% per 100 degrees Fahrenheit change in temperature. Thus, in some instances, when the pressure of the control fluid 220 in the first chamber 232 of the first accumulator 222 and/or the second chamber 250 of the second accumulator 224 increases due to an increase in temperature, the second piston 246 of the second accumulator 224 moves further toward the second end 246*b* of the second housing 244 to increase a volume of the first chamber 250 and displaces an amount or volume of the process fluid 235 in the second chamber 254 back into the pipeline 104 via the pressure line 126. The second accumulator 224 accommodates or compensates for thermal expansion of the control fluid 220 in the first accumulator 222 because the respective first chambers 232 and 250 are fluidly coupled via the supply line 240. Similarly, when the pressure of the control fluid 220 decreases due to thermal contraction, the pressurized process fluid 235 causes the second piston 246 to move toward the first end 244*a* of the second housing 244. Further, thermal expansion of the process fluid 235 in the pipeline 104 is negligible due to a vast quantity of the process fluid 235 relative to the control fluid 220.

Figure 3:
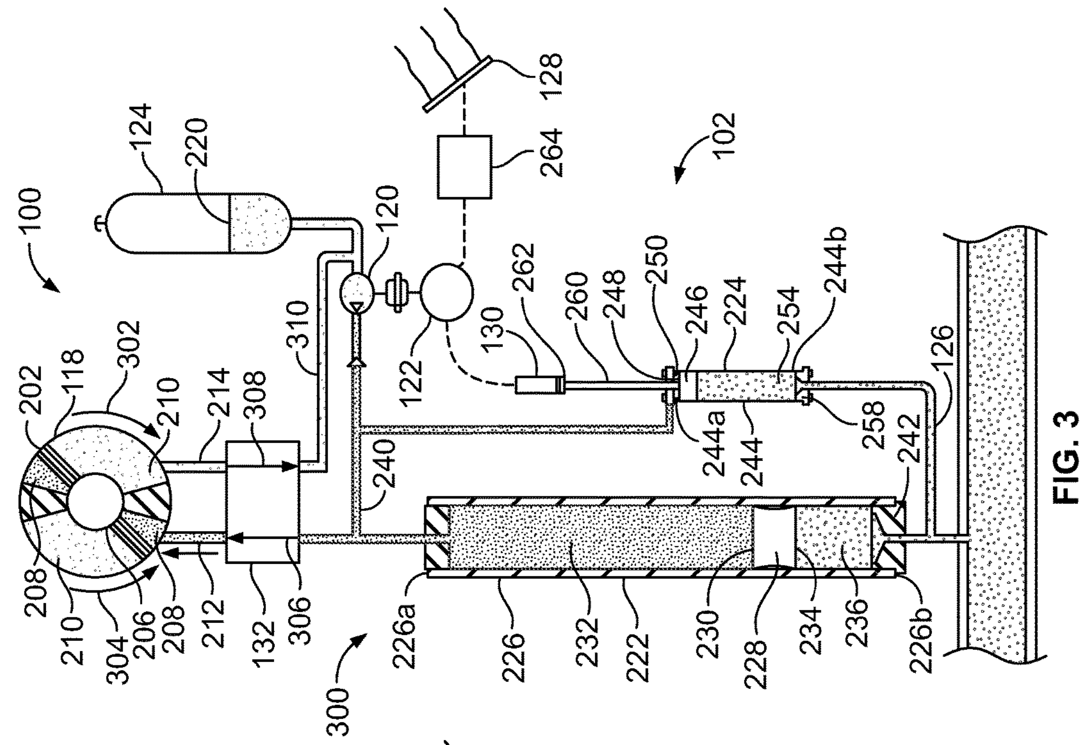
FIG. 3 is a schematic illustration of the example control valve assembly of FIGS. 1 and 2 showing the example control fluid power apparatus in a partially discharged state.

FIG. 3 illustrates the example control valve assembly 100 of FIGS. 1 and 2 shown in a partially discharged state or discharge mode 300 to operate the actuator 118. To operate the actuator 118, the directional controller 132 of the illustrated example receives one or more signals to operate one or more valves (e.g., solenoid valves) of the directional controller 132. For example, the directional controller 132 directs the control fluid 220 from the first accumulator 222 into the first chamber 208 of the actuator 118 to move or stroke the actuator 118 in a first direction 302 (e.g., a clockwise direction in the orientation of FIG. 3) or directs the control fluid 220 from the first accumulator 222 into the second chamber 210 of the actuator 118 to move the actuator 118 in a second direction 304 opposite the first direction 302 (e.g., a counterclockwise direction in the orientation of FIG. 3).

For example, FIG. 3 illustrates the directional controller 132 configured to allow movement of the actuator 118 in the first direction 302 to move the flow control member of the valve 106 (FIG. 1) from a first position (e.g., a fully open position) to a second position (e.g., a fully closed position). To move the actuator 118 in the first direction 302, the directional controller 132 operates a first valve 306 to allow fluid flow between the supply line 240 and the first chamber 208 of the actuator 118 via the first line 212. Additionally, the directional controller 132 operates a second valve 308 to allow fluid flow from the second chamber 210 of the actuator 118 to the reservoir 124 via the second line 214 and a return line 310. Thus, as the first chamber 208 of the actuator 118 is pressurized or filled with the control fluid 220, the control fluid 220 in the second chamber 210 of the actuator 118 flows to the reservoir 124 via the return line 310.

In operation, when the directional controller 132 fluidly couples the supply line 240 and the first chamber 208 of the actuator 118, the pressure in the first chamber 208 of the actuator 118 is less than the pressure of the control fluid 220 in the first chambers 232 and 250 of the respective first and second accumulators 222 and 224, causing the control fluid 220 to flow to the first chamber 208 of the actuator 118. In particular, the control fluid 220 in the first chamber 250 of the second accumulator 224 discharges to the first chamber 208 of the actuator 118 prior to the control fluid 220 in the first chamber 232 of the first accumulator 222. More specifically, the second piston 246 moves prior to the first piston 228 because a greater pressure differential is sensed by the second piston 246 than the first piston 228 given that the first area of the first side 256 of the second piston 246 is less than the second area of the second side 252 of the second piston 246 (i.e., due to the rod 260 as noted above) and the first area of the first side 230 of the first piston 228 is substantially equal to the second area of the second side 234 of the first piston 228. In other words, the pressure differential across the second piston 246 provides a path of least resistance given that the pressure of the process fluid 235 in the second chamber 254 is greater than the pressure of the control fluid 220 in the first chamber 250 at the time of fluid communication with the first chamber 208 of the actuator 118, thereby causing the second piston 246 to move toward the first end 244*a* of the second housing 244 prior to the first piston 228 of the first accumulator 222 moving toward the first end 226*a* of the first housing 266. As a result, the control fluid 220 in the first chamber 250 of the second accumulator 224 discharges to the first chamber 208 of the actuator 118 prior to discharge of the control fluid 220 in the first chamber 232 of the first accumulator 222.

Once the control fluid 220 is fully discharged from the first chamber 250 of the second accumulator 224, the control fluid 220 in the first chamber 232 of the first accumulator 222 then flows to the first chamber 208 of the actuator 118. As the volume of control fluid 220 in the first chamber 232 of the first accumulator 222 decreases as the control fluid 220 flows to the first chamber 208 of the actuator 118, the volume of the process fluid 235 in the second chamber 236 of the first accumulator 222 increases. In turn, the pressurized process fluid 235 applies a force to the second side 234 of the first piston 228 that is greater than a force provided to the first side 230 of the first piston 228 by the control fluid 220, causing the first piston 228 to move toward the first end 226*a* of the first housing 226. In other words, the pressure of the process fluid 235 provides a head pressure to the first accumulator 222 to discharge the pressurized control fluid 220 from the first chamber 232 of the first accumulator 222 and into the first chamber 208 of the actuator 118 to rotate the vane 202 in the first direction 302.

As the vane 202 moves or rotates within the actuator housing 204 in the first direction 302, the vane 202 causes a volume of the first chamber 208 to increase and a volume of the second chamber 210 to decrease. In turn, the vane 202 causes the valve shaft 206 to rotate in the first direction 302, which causes the valve plug of the valve 106 to move from a first position (e.g., a fully open position) to a second position (e.g., a fully closed position). Further, the pressure of the process fluid remains substantially constant (e.g., within 1 psi) during a stroke (e.g., a complete stroke) of the actuator 118 (e.g., the vane 202 moving the first position to the second position). In other words, the process fluid 235 provides a constant pressure during a discharge (e.g., a full discharge) of the control fluid 220 from the first chamber 232 of the first accumulator 222 (i.e., as the first piston moves from the second end 226*b* toward the first end 226*a*), thereby enabling the control fluid 220 to provide a constant torque or force to the actuator 118 throughout a stroke length (e.g., an entire stroke) of the actuator 118. For example, a constant torque is applied to the vane 202 as the vane moves from a first position shown in FIG. 2 to a second position shown in FIG. 4.

FIG. 4 illustrates the fluid control apparatus 102 of FIGS. 1-3 in a fully discharged state or condition 400. In the fully discharged state 400, the volume of the first chamber 232 of the first accumulator 222 is at a minimum and the volume of the second chamber 236 is at a maximum. Likewise, the volume of the first chamber 250 of the first accumulator 222 is at a minimum and the volume of the second chamber 254 is at a maximum. In other words, the first piston 228 of the first accumulator 222 is adjacent and/or in direct engagement with the first end cap 238 and the second piston 246 of the second accumulator 224 is adjacent and/or in direct engagement with the first end cap 256 of the second accumulator 224. Further, the target 262 of the rod 260 is positioned to continue activation of the motor 122 and the pump 120.

Figure 5:
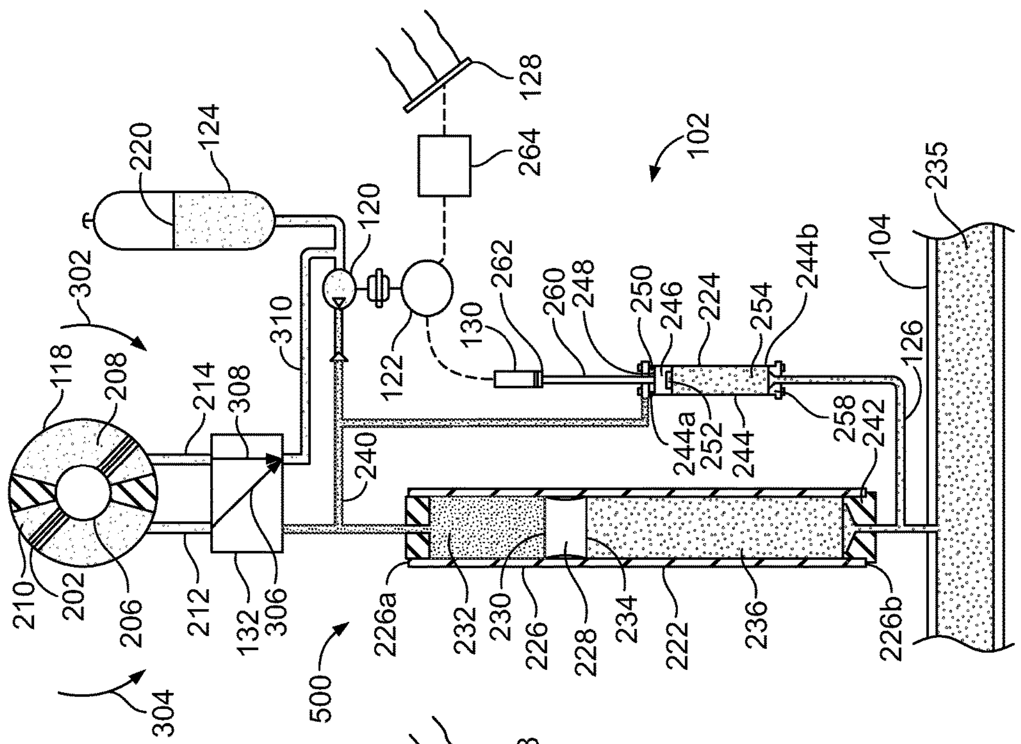
FIG. 5 is a schematic illustration of the example control valve assembly of FIGS. 1-4 showing the example control fluid power apparatus in a partially recharged state.

FIG. 5 illustrates fluid control apparatus 100 of FIG. 2 in a partially recharged state or a recharging mode 500. After the vane 202 of the actuator 118 is moved to the second position (e.g., as shown in FIGS. 4 and 5), demand for the control fluid 220 decreases and the directional controller 132 receives a signal to fluidly decouple the supply line 240 of the control fluid power apparatus 102 from the actuator 118. For example, to recharge the first accumulator 222 with the control fluid 220, the directional controller causes the first valve 306 to fluidly couple the first line 212 and the return line 310. Likewise, the directional controller 132 causes the second valve 308 to fluidly couple the second line 214 and the return line 310. In other words, the supply line 240 downstream of the pump 120 is isolated from the first and second chambers 208 and 210 of the actuator 108. Thus, the supply line 240 is only fluidly coupled to the first chambers 232 and 250 of the respective first and second accumulators 222 and 224.

Additionally, the motor 122 and the pump 120 are activated by the position of the rod 260 of the second accumulator 224 relative to the switch 130. For example, when the second piston 246 of the second accumulator 224 moves toward the first end 244*a* of the second housing 244, the rod 260 moves toward the switch 130 and activates the switch 130. For example, the rod 260 and/or the target 262 activates the switch 130 when the rod 260 and/or the target 262 moves in proximity to the switch 130 (e.g., within a distance of a quarter inch of the switch 130). As a result, the motor 122 activates and drives the pump 120. As a result, the pump 120 charges and/or pressurizes the control fluid 220 from the reservoir 124 and provides the pressurized control fluid to flow into the first chambers 232 and 250 of the respective first and second accumulators 222 and 224 via the supply line 240. In particular, a pressure of the control fluid 220 provided by the pump 120 is greater than a pressure of the process fluid 235 in the second chambers 236 and 254 of the respective first and second accumulators 222 and 224.

Additionally, the pressure differential across the first piston 228 is less than a pressure differential across the second piston 246 given that the first area of the first side 248 of the second piston 246 is less than the second area of the second side 252 of the second piston 246, and the first area of the first side 230 of the first piston 228 is substantially equal to the second area of the second side 234 of the first piston 228. Thus, the force provided by the pressurized control fluid 220 to the first side 248 of the second piston 246 is less than a force provided by the pressurized control fluid 220 to the first side 230 of the first piston 228. As a result, a path of least resistance is provided between the pump 120 and the first chamber 232 of the first accumulator 222. Thus, the first piston 228 moves toward the second end 226*b* of the first housing 226 prior to the second piston 246 moving toward the second end 244*a* of the second housing 244. In other words, the first chamber 232 of the first accumulator 222 fills (e.g., completely fills as shown in FIG. 1) prior to the first chamber 250 of the second accumulator 224 begins to move. Thus, the second accumulator 224 is configured to enable the first chamber 250 of the second accumulator 224 to discharge prior to the control fluid 220 in the first chamber 232 of the first accumulator 222 during a discharge state (e.g., the discharge state 300 of FIG. 3) and receives the control fluid 220 after the first chamber 232 of the first accumulator 222 during the recharging state 500. This ensures that the switch 130 is activated until the first chamber 232 of the first accumulator 222 is in the fully charged state 200 of FIG. 2. In other examples, a valve (e.g., a solenoid valve) may be positioned between the first chamber 250 of the second accumulator 224 and the pump 120 and/or the first chamber 232 of the first accumulator 222 to cause the control fluid 220 to completely fill the first chamber 232 of the first accumulator 222 prior to the control fluid 220 flowing to and/or filing the first chamber 250 of the second accumulator 224 during a recharging process.

In turn, during the recharging state 500, the pressurized control fluid 220 exerts a force on the first side 230 of the first piston 228 via the first chamber 232 that is greater than the force applied to the second side 234 of the first piston 228 by the pressurized process fluid 235 in the second chamber 236, thereby causing the first piston 228 to move toward the second end 226*b* of the first housing 226. As the first piston 228 of the first accumulator 222 moves toward the second end 226*b* of the first housing 226 and the first chamber 232 fills with the control fluid 220, the volume of the first chamber 232 increases as the first chamber 232 accumulates a greater volume of pressurized control fluid 220. At the same time, the volume of the second chamber 236 decreases and the process fluid 235 in the second chamber 236 returns to the pipeline 104 via the pressure line 126. Thus, none of the process fluid 235 in the second chamber 236 of the first accumulator 222 is exhausted to the atmosphere. Additionally, the second end cap 242, the coated inner surface 226*c* and/or coated components (e.g., the first piston 228) and/or the attitude or orientation of the first accumulator 222 facilitate the movement of impurities and contaminants back into the pipeline 104, thereby increasing the operational life of the first accumulator 222.

After the first accumulator 222 is fully charged (e.g., the first chamber 232 is at a maximum volume as shown in FIG. 2), the pressurized control fluid 220 flows to the first chamber 250 of the second accumulator 224, causing the second piston 246 to move toward the second end 244*b* of the second housing 244. The second piston 246 of the second accumulator 224 moves a distance toward the second end 244*b* of the second housing 244 until the rod 260 and/or the target 262 moves a distance away (e.g., greater than approximately a quarter of an inch) from the switch 130 sufficient to deactivate the motor 122 and the pump 120. Similar to the first accumulator 222, any process fluid 235 displaced from the second chamber 254 of the second accumulator 224 is returned to the pipeline 104 via the pressure line 126 and none of the process fluid 235 in the second chamber 254 is exhausted to atmosphere. The second end cap 258, the coated inner surface 244*c* and/or coated components (e.g., the second piston 246) and/or the attitude or orientation of the second accumulator 224 facilitate the movement of impurities and contaminants back into the pipeline 104, thereby increasing the operational life of the second accumulator 224.

When the motor 122 shuts off, the control fluid power apparatus 102 is recharged and ready for the next stroke cycle of the actuator 118. To operate the vane 202 in the second direction 304, the directional controller 132 directs the second valve 308 to fluidly couple the second line 214 to the supply line 240 and the directs the first valve 306 to fluidly couple the first line 212 to the return line 310. When the vane 202 moves or rotates within the actuator housing 204 in the second direction 304 (e.g., a counterclockwise direction) opposite the first direction 302, the vane 202 causes the volume of the second chamber 210 to increase and the volume of the first chamber 208 to decrease to cause the valve shaft 206 to rotate in the second direction 304, thereby causing the valve 106 to move from the second position to the first position.

Although certain example apparatus, methods, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A control fluid power apparatus, comprising:

a first housing having a first piston defining a first chamber and a second chamber, the first chamber to receive a control fluid and the second chamber to receive a process fluid from a process system, the first chamber to be oriented above the second chamber when the control fluid power apparatus is coupled to a control valve assembly; and a second housing having a second piston defining a third chamber and a fourth chamber, the third chamber to receive the control fluid and the second chamber is to receive the process fluid, the third chamber to be oriented above the fourth chamber when the control fluid power apparatus is coupled to the control valve assembly.

2. An apparatus of claim 1, wherein the first housing and the second housing are oriented in a substantially vertical orientation.

3. An apparatus of claim 2, wherein the second chamber of the first housing is positioned between the first chamber of the first housing and a pipeline of the process system, and the fourth chamber of the second housing is positioned between the third chamber of the second housing and the pipeline.

4. An apparatus of claim 1, wherein a pressure differential across the first piston provided by the control fluid and the process fluid is to cause the first piston to move between a first position and a second position.

5. An apparatus of claim 1, wherein the third chamber of the second housing is fluidly coupled to the first chamber of the first housing.

6. An apparatus of claim 1, further comprising a motor and a pump to recharge the first chamber of the first housing when the first chamber is discharged.

7. An apparatus of claim 1, further comprising a switch activator coupled to the second piston to activate a switch to operate a motor and a pump when the first chamber of the first housing is being recharged.

8. An apparatus of claim 1, wherein the first housing has a first end cap coupled to a first end adjacent the first chamber and a second end cap coupled to a second end adjacent the second chamber, the second end cap having a tapered profile or shape.

9. An apparatus of claim 1, wherein a first area of a first side of the first piston is substantially equal to a second area of a second side of the first piston.

10. An apparatus of claim 9, wherein a third area of a third side of the second piston is less than a fourth area of a fourth side of the second piston.

11. An control fluid power apparatus for use with fluid control valve comprising:

- a rotary vane actuator having a vane defining a first cavity and a second cavity;
- a first accumulator having a first piston to define a first chamber and a second chamber, the first chamber to receive a control fluid and the second chamber to be fluidly coupled to a process fluid flowing through a process system pipeline, the first chamber being positioned topside the second chamber when the first accumulator is coupled to the control valve such that the second chamber is positioned between the first chamber and the process system pipeline;
- a second accumulator having a second piston to define a third chamber and a fourth chamber, the third chamber to receive the control fluid and the fourth chamber to be fluidly coupled to the process fluid flowing through the process system pipeline, the third chamber being positioned topside the fourth chamber when the second accumulator is coupled to the control valve such that the fourth chamber is positioned between the third chamber and the process system pipeline, the third chamber of the second accumulator to be fluidly coupled to the first chamber of the first accumulator; and
- a directional controller to direct fluid flow between the first chamber of the first accumulator and at least one of the first cavity or the second cavity of the actuator.

12. An apparatus of claim 11, further comprising a pump to provide pressurized control fluid to the first chamber of the first accumulator and the second chamber of the second accumulator when the first accumulator is in a recharge state.

13. An apparatus of claim 12, wherein the directional controller prevents control fluid in the first chamber of the first accumulator and the third chamber of the second accumulator from flowing to at least one of the first cavity or the second cavity of the actuator to recharge the first chamber of the first accumulator with the pressurized control fluid.

14. An apparatus of claim 12, further comprising a switch activator coupled to the second piston via a rod, the switch activator to activate a switch to operate the pump when the first chamber of the first accumulator is the recharge state.

15. The apparatus of claim 11, wherein the first accumulator comprises an end cap adjacent the second cavity that includes an aperture having a tapered profile to facilitate movement of impurities in the process fluid to the process fluid pipeline when the process fluid is discharged from the second cavity.

16. The apparatus of claim 11, wherein the first and second chambers of the first accumulator and the third and fourth chambers of the second accumulator are positioned above the process fluid pipeline.

17. The apparatus of claim 11, wherein the first and second accumulators are positioned substantially vertical attitude or orientation relative to a ground.

18. An control fluid power apparatus for use with a fluid control valve comprising:

- first means for storing energy having a first means for receiving a control fluid and a second means for receiving a process fluid, the first means for receiving the control fluid being positioned above the second means for receiving the process fluid;
- second means for storing energy having a third means for receiving the control fluid and fourth means for receiving the process fluid, the third means for receiving the control fluid being positioned above the fourth means for receiving the process fluid;
- first means for fluidly coupling the first means for receiving the control fluid and the third means for receiving the control fluid to a control fluid supply; and
- second means for fluidly coupling the second means for receiving the process fluid and the fourth means for receiving the process fluid to a pipeline of a process system, wherein the second means for receiving the process fluid and the fourth means for receiving the process fluid being positioned above the pipeline when the fluid control valve is coupled to the process system.

19. The apparatus as defined in claim 18, further comprising means for controlling flow the control fluid between the first and third means for receiving the control fluid and an actuator of the fluid control valve.

20. The apparatus as defined in claim 18, wherein at least one of the second means for receiving the process fluid or the fourth means for receiving the process fluid includes means for facilitating movement of impurities or contaminates in the process fluid back to the pipeline when the process fluid is discharged from the respective second means for receiving the process fluid or the fourth means for receiving the process fluid.

* * * * *